United States Patent [19]

Combs

[11] Patent Number: 4,537,555

[45] Date of Patent: Aug. 27, 1985

[54] WIRE ROPE SPARE TIRE CARRIER

[75] Inventor: Linsey L. Combs, Seminole, Okla.

[73] Assignee: W.W.B. Developers, Midvale, Utah

[21] Appl. No.: 693,223

[22] Filed: Jan. 18, 1985

Related U.S. Application Data

[63] Continuation of Ser. No. 581,138, Feb. 17, 1984, abandoned, which is a continuation of Ser. No. 378,911, May 17, 1982, abandoned.

[51] Int. Cl.³ .............................................. B62D 43/04
[52] U.S. Cl. ........................................ 414/463; 70/259; 224/42.06; 224/42.23; 224/42.25; 254/389
[58] Field of Search ................................ 414/462–466; 224/42.06, 42.21, 42.23, 42.24, 42.25; 296/37.2; 70/212, 259, 260; 254/389

[56] References Cited

U.S. PATENT DOCUMENTS

| | | | |
|---|---|---|---|
| 1,352,559 | 9/1920 | Teel | 224/42.25 X |
| 2,325,848 | 8/1943 | Gildea et al. | 414/463 |
| 2,661,130 | 12/1953 | Evans | 414/463 |
| 3,390,864 | 7/1968 | Searcy et al. | 414/463 X |
| 3,539,152 | 11/1970 | Paul et al. | 414/463 X |
| 3,542,413 | 11/1970 | Hardison | 414/463 X |
| 3,554,397 | 1/1971 | Cluff | 414/463 |
| 4,329,107 | 5/1982 | Smith | 414/463 |

FOREIGN PATENT DOCUMENTS

| | | | |
|---|---|---|---|
| 548757 | 4/1932 | Fed. Rep. of Germany | 254/389 |
| 650872 | 3/1979 | U.S.S.R. | 414/463 |

Primary Examiner—Leslie J. Paperner
Attorney, Agent, or Firm—Head, Johnson & Stevenson

[57] ABSTRACT

A vehicle undercarriage spare tire carrier having a roll bar secured adjacent the storage position of the tire, a pulley assembly secured on the rear bumper of the vehicle, a lever arm pivotally secured to the rear bumper of the vehicle in spaced relation with respect to the pulley assembly, a bracket removably securable to the wheel of the spare tire, a flexible cable secured between the bracket and the lever arm and passing over the roll bar and around the pulley assembly whereby pivoting of the lever arm in one direction lowers the spare tire from the storage position for releasing of the tire for retrieval thereof, and pivoting of the lever arm in an opposite direction pulls the tire into the storage position thereof, and a latching bracket secured to the rear bumper of the vehicle and engagable by the lever arm for locking the lever arm in the position thereof which locks the tire in the storage position.

5 Claims, 9 Drawing Figures

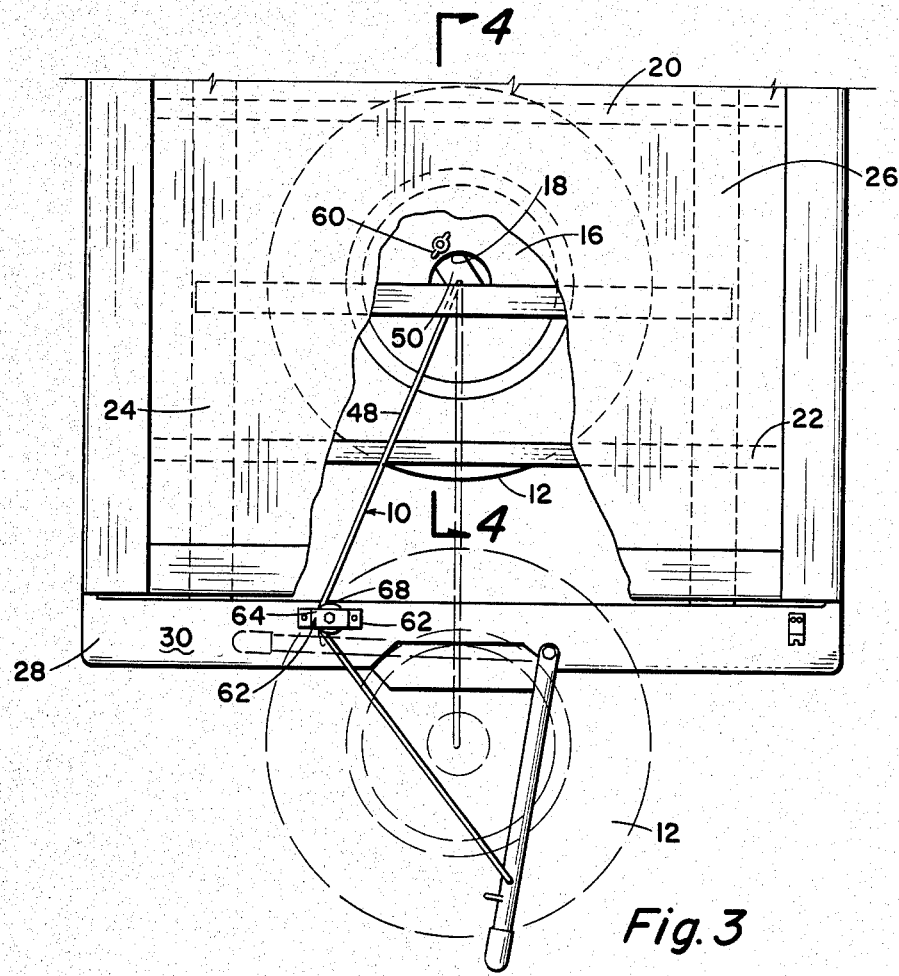
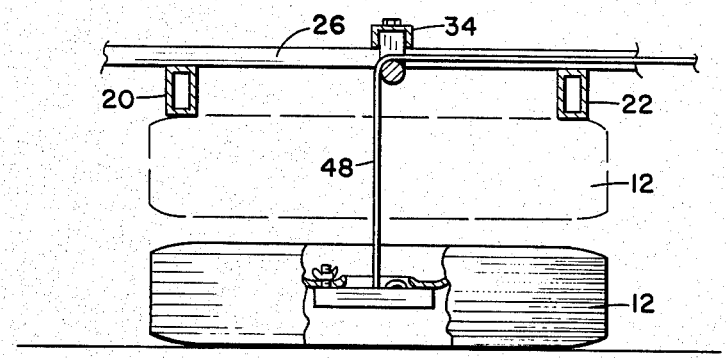
Fig. 3
Fig. 4

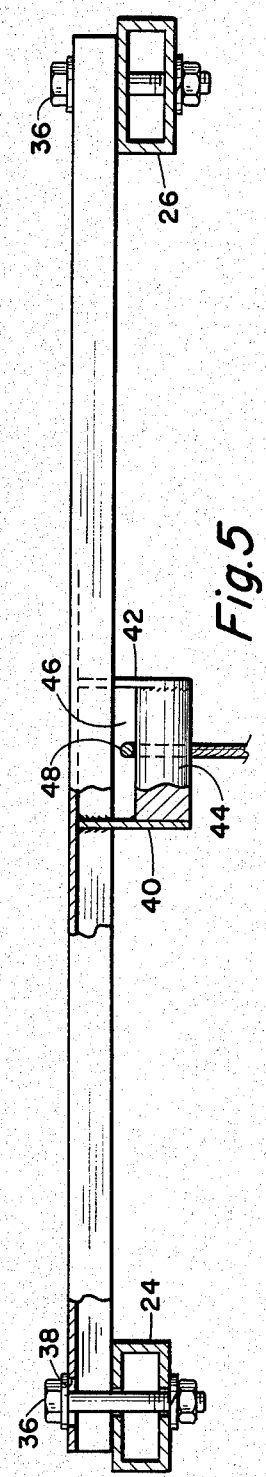
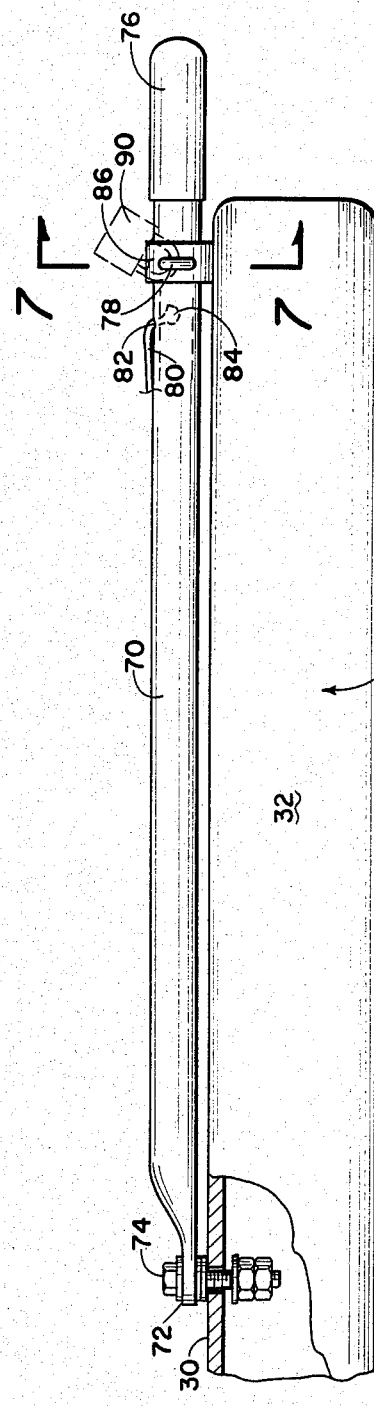
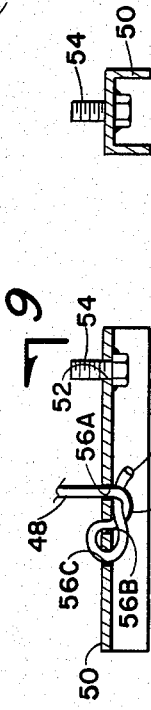
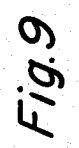

WIRE ROPE SPARE TIRE CARRIER

CROSS-REFERENCE TO RELATED APPLICATION

This is a continuation of application Ser. No. 581,138, filed 2/17/84, abandoned, which is a continuation of application Ser. No. 378,911, filed May 17, 1982, abandoned.

This application is related to Lindel F. Smith application Ser. No. 114,065, filed Jan. 21, 1981 and entitled "Wire Rope Spare Tire Carrier" and with which I am familiar.

BACKGROUND OF THE INVENTION

1. Field of the Invention

This invention relates to improvements in vehicle spare tire carriers and more particularly, but not by way of limitation, to a wire rope spare tire carrier actuated by a pivotal lever arm disposed remotely with respect to the storage position of the tire.

2. Description of the Prior Art

It is common practice today to secure or store the spare tire of a pickup truck beneath the bed of the truck by means of an elongated bracket plate which is usually pivotally secured at one end to the underneath side of the truck bed. The opposite end of the bracket is normally connected to the truck by a threaded stud and bolt, and in order to remove the spare tire one must crawl beneath the bed of the pickup truck, unscrew the bracket nut and simultaneously exert an upward pressure on the tire for holding it in position to preclude an accidental dropping from the stored position. One end of the bracket may then be lowered simultaneously with the tire it is supporting, and the tire may then be pulled or slide from under the truck in order that the spare tire may be used for whatever purpose it is needed, as for example to change with another tire, or for repair thereof.

The remount of the spare tire in the storage position is particularly cumbersome and usually requires a considerable amount of strength on the part of the person mounting the tire since the tire must be fitted back against the bracket and then the tire and bracket simultaneously lifted into a position near or against the under side of the truck bed so that the bracket may be attached to the threaded stud. The bolt must then be secured to the stud member in order to secure the tire and bracket in position. The disadvantages of this method and means for storing of a pickup truck spare tire will be apparent.

Several solutions to this problem have been presented in the way of wire rope or cable attachments for the spare tire wherein the spare tire may be winched into position or pulled into position by a series of pulleys and levers as taught by the Searcy et al U.S. Pat. No. 3,390,864, issued July 2, 1968 and entitled "Handling and Storage Apparatus for a Spare Tire and Wheel Assembly on a Vehicle." The Searcy patent includes an elongated lever arm pivotally secured to the rear bumper of a pickup truck, a first pulley located under the bed of the pickup truck adjacent the spare tire storage position, and a second pulley mounted on the rear bumper of the truck and spaced from the pivot point of the lever arm. A wire rope or cable extends from a bracket for holding the spare tire, around the first and second pulley and to the lever arm where it is attached thereto whereby the lever arm may be rotated away from the second pulley in order to lift the spare tire into the storage position under the vehicle bed. When the tire is lifted into position, the lever arm is held adjacent the rear bumper of the truck and is locked into position by an eyelet and padlock provided on the bumper of the truck. One problem with the Searcy device is that should the lock fail or accidentally come open, the tension in the cable will cause the lever arm to swing free, thereby releasing the spare tire onto the ground and creating a safety hazard. In addition, the spare tire holding bracket shown by Searcy is a rather complicated device having spring-loaded pivotal arms which fit through the center hole in the spare tire wheel which notches in these brackets grip the wheel member. However, in the event the tire becomes loose and free to bounce around while beneath the truck bed, the lever arms could become dislodged thereby causing loss of the spare tire.

Still additional prior patents disclose devices for securing a spare tire for a pickup truck in a manner for overcoming the problems thereof, such as the Walker U.S. Pat. No. 2,688,372, issued Sept. 7, 1954 and entitled "Vehicle Having Offset Drive Shaft and Tire Located Adjacent Thereto;" Fruetel U.S. Pat. No. 3,395,819 issued Aug. 6, 1968 and entitled "Spare Tire Holder for Vehicles"; Hardison U.S. Pat. No. 3,542,413, issued Nov. 24, 1970, and entitled "Apparatus for Storing Spare Wheels Under Vehicles"; Cluff U.S. Pat. No. 3,554,397, issued Jan. 12, 1971, and entitled "Spare Tire Lift and Carrier"; Kuhns U.S. Pat. No. 3,865,264, issued Feb. 11, 1975 and entitled "Spare Tire Mount"; and Australian Pat. No. 207,575, issued April, 1957. The Walker patent provides a means for raising a spare tire into a storage position beneath the floor of the usual passenger vehicle, and for lowering thereof when the tire is required. The raising and lowering device cannot be actuated as long as a particularly selected passenger door is in a closed position, and the device merely raises and lowers the tire in a vertical path, making retrieval of the tire and replacing thereof difficult. The Fruetel patent utilizes a cable having one free end provided with a dished bar which centers itself crosswire under the central opening of the wheel of a spare tire, and the opposite end secured to a winch. Rotation of the winch bar draws the tire and wheel assembly upwardly to its storage position and a lock secures the winch bar releasably against rotation to support the tire in the storage position.

The Cluff device comprises a pulley suspended beneath the bed of a flat bed vehicle, and a cable threaded through the pulley and passing over a second pulley, and having a mounting bracket at one end thereof, extends rearwardly for connection with a winch. The rotation of the winch in alternate directions raises and lowers the spare tire. The Hardison patent relates to a spare tire storing apparatus comprising a cable detachably connected with the wheel by means of a pair of separable members, one of which has an inoperative disposition in which it is adapted to pass through the axle opening of the wheel and an operative disposition in which it is adapted to lift the wheel in response to shortening the length of the cable. The other element is adapted to be interposed in the axle opening between the cable and the wheel to center the cable therein during a wheel lifting operation. The Kuhns spare tire mount includes a winch located in a housing adapted to be connected to the inside surface of the sidewall of the vehicle next to access holes; a flexible cable having one end secured to the winch shaft and another end releasably coupled to the spare tire; and a bracket attached to the underside of the vehicle for supporting the cable and hence the tire beneath the vehicle. A ratchet wheel and pawl are provided for the winch shaft for normally allowing the shaft to be rotated in one direction to wind the cable on the shaft for raising the spare tire upward to the storage position beneath the vehicle. The winch shaft is provided with a threaded end for receiving a lug nut whereby the shaft may be rotated by the usual lug wrench.

In order to solve the present day problems in the storage and retrieval of spare tire and wheels mounted on the underside of a pickup truck bed, or the like, a wire rope carrier has been developed as shown in the Smith application Ser. No. 114,065, filed Jan. 21, 1981, and entitled "Wire Rope Spare Tire Carrier" now U.S. Pat. No. 4,329,107, issued May 11, 1982, and with which I am familiar. This device has effectively solved the problem, but as a practical matter, has created certain additional problems. For example, a pulley is pivotally mounted in the proximity of the storage position for the spare tire for receiving the wire rope therearound, but in use this pulley "rocks" and quickly creates a "kink" in the cable, thus rendering operation of the device difficult. In addition, the particular arrangement between the actuating lever and the second pulley creates a problem in that the position of the pulley and locking or latching arrangement of the lever are inefficient.

SUMMARY OF THE INVENTION

The present invention contemplates a novel wire rope spare tire carrier similar to that shown in the aforementioned Smith application, but which overcomes the problems associated therewith. The present invention comprises a cross member secured to the frame of the vehicle in the proximity of and above the storage position of the tire beneath the bed of a pickup-type truck. The outer periphery of the cross member is circular for receiving the wire rope therearound. A pulley is secured on the upper surface of the vehicle bumper, with the plane of the pulley being in substantial alignment with the plane of said upper surface, and the pulley is in communication with the cross member by a bore or aperture provided in the bumper adjacent the pulley. An elongated lever arm is pivotally secured to the bumper, the pivot point thereof being spaced from the pulley. A wire rope has one end secured to the lever arm in spaced relation with respect to the pivot point, and extends around the pulley and over the outer periphery of the cross member and terminates beneath the truck. A bracket is secured to the opposite end of the wire rope for holding the spare tire.

The pivot point for the lever arm is spaced rearwardly of the pulley so that when the lever arm is rotated in a direction away from the cross member the spare tire is lifted into its storage position, and since the lever arm pivot point is spaced rearwardly with respect to the position of the pulley, the lever arm may be rotated beyond a breakover point thereby locking the tire in its storage position. A latch means is provided on the bumper for receiving the outer end of the lever arm member therein when the lever arm is positioned in said breakover-locking position, and the tension in the cable facilitates the retention of the lever in its locked position.

In order to lower the spare tire, a rearward force must be applied to the lever arm moving it from its locking position and past its breakover point whereby the lever arm may then be rotated in a direction toward the cross member, and the cable, moving over the outer periphery of the cross member, lowers the spare tire onto the ground so that the spare tire may be pulled from beneath the vehicle.

The present invention also provides a very simple-to-operate, but positive locking bracket member for securing the outer or free end of the cable to the spare tire. The bracket member comprises a channel member having a plurality of bores provided therein for receiving the free end of the cable therethrough in order to secure the bracket to the cable. In addition, an offset bore is provided in the channel and a threaded stud extends therethrough for engagement with one of the usual lug bolt holes of the spare tire wheel whereby the bracket may be secured to the wheel. The length of the channel is sufficiently long as to span the distance from the said lug bolt hole to a point across the diameter of the central hole of the wheel whereby the wheel may be engaged and supported by the bracket.

To secure the bracket to the tire, the channel member is positioned in such a manner as to be longitudinally inserted through the center hole of the wheel until it has passed completely through the wheel. The bracket is then rotated parallel to the plane of the tire and pulled in an axial direction by means of the cable attached thereto so that the channel engages the wheel. The channel may then be properly oriented with respect to the wheel whereby the bolt may be inserted through one of the lug bolt holes, and a wing nut, or the like, may be secured to the bolt for securing the bracket to the wheel. To remove the bracket from the wheel, the wing nut may be removed and the bolt may be withdrawn from the engagement with the lug bolt hole. The bracket may then be rotated to a position for withdrawal through the center hole of the wheel. It will be readily apparent that the bracket is adapted to be positively secured to the wheel, but is readily removable therefrom. The novel wire rope spare tire carrier is simple and efficient in operation and economical and durable in construction.

BRIEF DESCRIPTION OF THE DRAWINGS

FIG. 3 is a view similar to FIG. 2 showing both the storage and withdrawal positions for the spare tire.

FIG. 4 is a view taken on line 4—4 of FIG. 3, with a storage position for the tire being shown in broken lines and a lowered position therefor being shown in solid lines.

FIG. 5 is a side elevational view of a cross member utilized in a wire rope spare tire carrier, with portions shown in section for purposes of illustration.

FIG. 6 is a rear elevational view of one end of the vehicle bumper with the actuator lever arm utilized in a wire rope spare tire carrier embodying the invention, the lever arm being shown in the latched position for retaining the spare tire in the storage position.

FIG. 7 is a view taken on line 7—7 of FIG. 6.

FIG. 8 is a sectional elevational view of the securing bracket utilized in a wire rope spare tire carrier embodying the invention.

FIG. 9 is a view taken on line 9—9 of FIG. 8.

DETAILED DESCRIPTION OF THE PREFERRED EMBODIMENT

Figure 1:
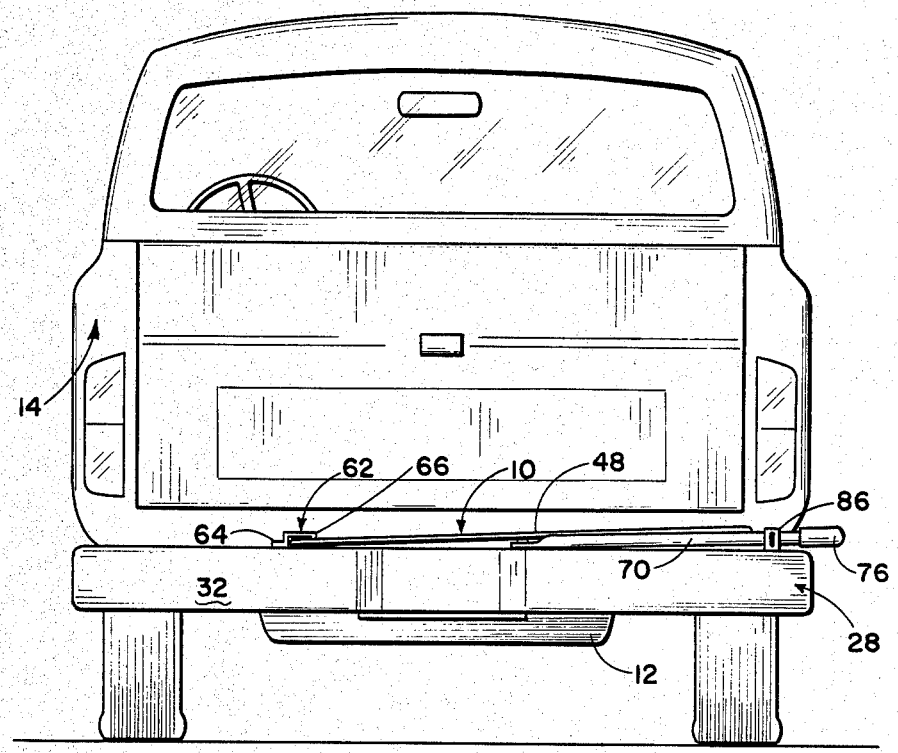
FIG. 1 is a rear elevational view of a vehicle having a spare tire secured thereto by means of a wire rope spare tire carrier embodying the invention.

Referring to the drawings in detail, reference character 10 generally indicates a wire rope spare tire carrier suitable for removably carrying and securing a spare tire 12 beneath the undercarriage of a vehicle, such as a pickup truck 14, or the like. The usual spare tire 12 is mounted on a wheel member 16 having a center hole 18 provided therein, and having the usual lug bolts holes 19, as is well known. Whereas the particular embodiment shown herein is related to use with the pickup truck 14, it is to be understood that the invention may be suitable for carrying and securing spare tires on large trucks or automobiles, if desired, and there is no intention of limiting the invention to use thereof with a pickup truck.

As shown herein, the truck 14 is normally provided with a plurality of longitudinally spaced cross members such as shown at 20 and 22, and longitudinally extending transversely spaced frame members 24 and 26. The spare tire 12 is normally stored in a position between the frame members 24 and 26 and against the cross members 20 and 22. The truck 14 is also usually provided with a rear bumper 28 which typically comprises a rearwardly extending horizontally disposed plate member 30 having a peripheral flange 32 extending vertically downwardly therefrom.

The spare tire carrier 10 comprises a cross bar 34 which is adapted to be secured between the frame members 24 and 26 and is preferably substantially centrally disposed between the cross member 20 and 22. Whereas the bar 34 as shown herein is secured to the upper side of the frame members 24 and 26, it is to be understood it may be secured to the lower side of the frame members. The bar 34 is preferably constructed from a channel member and is provided with apertures in the proximity of the opposite ends thereof for receiving bolts 36 therethrough in order to secure the bar 34 to the frame members 24 and 26. At least one of the apertures, such as shown at 38 in FIG. 5, is elongated in order to compensate for variable dimensions in the spacing between the frame members 24 and 26 to facilitate the installation of the bar 34 thereon. A pair of spaced flanges 40 and 42 are welded or otherwise secured to the bar 34 and substantially centrally disposed between the outer ends thereof and a rod 44 is welded or otherwise rigidly secured between the flanges 40 and 42. The outer periphery of the rod 44 is preferably substantially circular, and is spaced from the bar 34 to provide a hiatus 46 therebetween whereby a cable or wire rope 48 may be passed between the rod 44 and bar 34 and supported by the outer periphery of the rod.

One end of the wire rope 48 is removably secured to a bracket 50 which is adapted to engage the wheel 16 in a manner and for a purpose as will be hereinafter set forth. The bracket 50 is preferably constructed from channel iron, or the like, and is provided with a bore 52 (FIG. 8) in the proximity of one end thereof for receiving a threaded stud member 54 therein. It may be preferable to weld or otherwise rigidly secure the stud 54 in position to preclude accidental loss thereof from the bracket 50. In addition, three apertures 56a, 56b and 56c are provided in the general proximity of the longitudinal center of the bracket 50 for receiving the free end 49 of the rope 48 therethrough. The end 49 of the rope 48 may be initially passed through the aperture 56a, reversed in direction and passed through the aperture 56b, again reversed in direction and passed through the aperture 56c, and "tucked" under the initial loop 58 for securely locking the rope 48 to the bracket 50. In order to secure the bracket 50 and wire rope 48 to the wheel 16, the bracket 50 may be manually oriented in such a manner that it may be passed through the center hole 18 of the wheel 16, and the bolt 54 may be inserted through one of the lug bolt holes 19 and secured therein by a suitable wing nut 60, or the like.

Figure 2:
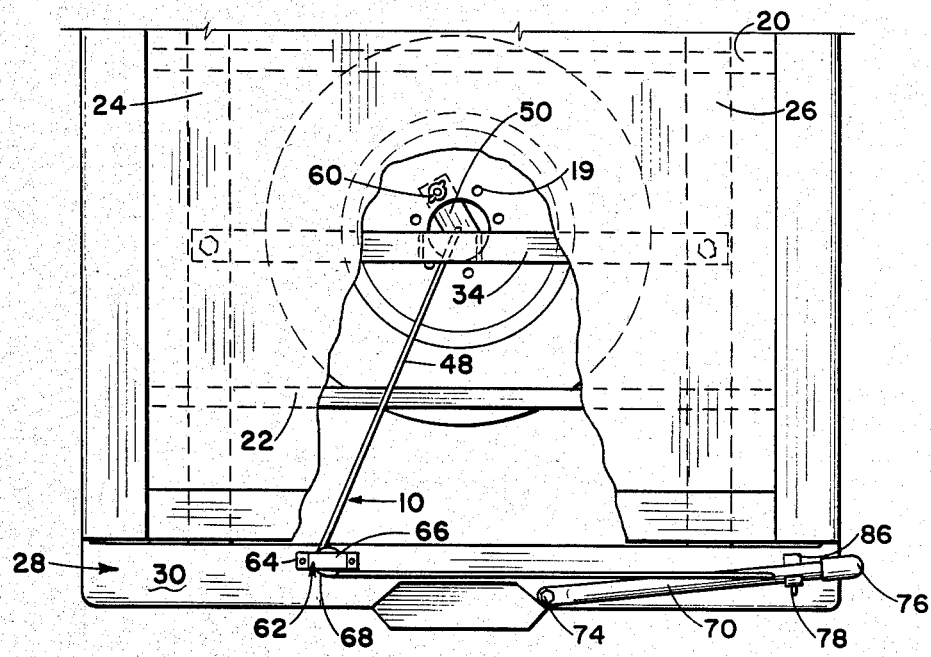
FIG. 2 is a plan view of a portion of the vehicle bed and rear bumper having the spare tire secured thereto by means of a wire rope spare tire carrier embodying the invention and showing the tire in the storage position, with portions shown in broken lines and portions cut-away for purposes of illustration.

A pulley assembly 62 is bolted or otherwise secured to the upper surface of the plate 30 of the bumper 28, as particularly shown in FIGS. 1, 2 and 3. The assembly 62 comprises a strap member 64 having an inverted U-shaped bracket 66 integral therewith or secured thereto. A pulley member 68 is suitably journalled in the hiatus between the strap 64 and bracket 66 and is freely rotatable with respect thereto, as is well known. The plane of the pulley 68 is preferably substantially parallel to the plane of the plate 30, and receives the rope 48 therearound. In the event there is not sufficient space between the bumper 28 and the lower edge of the rear portion of the vehicle 14, it may be necessary to drill or otherwise provide an aperture in the rear panel of the vehicle to permit passage of the rope between the bar of rod 44 and the pulley 68. As clearly shown in FIGS. 1, 2 and 3, the pivot axis of the pulley 68 is preferably disposed at an offset position with respect to the longitudinal and transverse center of the plate 30, and as a result the path of the rope 48 between the rod 44 and the pulley 68 is at an angle with respect to the longitudinal axis of the truck 14.

An elongated lever arm 70, preferably constructed from a suitable hollow bar stock, but not limited thereto, is provided with a flattened portion 72 at one end thereof for pivotal connection with the plate 30 of the bumper 28. The arm 70 may be secured to the bumper 28 in any suitable manner, such as a pivot pin 74 extending through a bore 76 (FIG. 5) provided in the plate 30, and the pivot connection of the arm 70 is preferably offset with respect to the longitudinal and transverse center of the plate 30 and is oppositely disposed with respect to the position of the pulley 68, as clearly shown in FIGS. 2 and 3. The outer end of the arm 70 may be provided with a suitable hand grip means 76, and a loop or eye member 78 is provided on the outer periphery of the arm 70 and spaced inboard of the hand grip 76. The eye member 78 extends radially outwardly from the arm 70 for a purpose as will be hereinafter set forth. In addition, the opposite end 80 of the rope 48 passes through a bore 82 provided in the arm inboard of the eye member 78, and is secured to the arm 70 in any suitable manner, such as by an enlarged knot 84, or the like disposed within the interior of the arm 70, as is well known.

An arcuate bracket member 86 is bolted or otherwise secured to the plate 30 of the bumper 28 and is positioned thereon for substantial alignment with the eye member 78 when the arm 70 is in a latched or locked position, as will be hereinafter set forth. The bracket 86 is provided with en elongated slot 88 for receiving the eye 78 therethrough as shown in FIGS. 6 and 7 when the arm 70 is in the locking position thereof. If desired, a suitable locking means, such as a padlock 90 (shown in broken lines in FIG. 6) may be inserted through the eye member 78 extending through the slot 88 for assuring retention of the arm 70 in said locked position therefor.

In operation, the bracket 50 is installed in engagement with the wheel 16 in the manner as hereinbefore set forth, with the bolt 54 and complementary wing nut 60 securing the bracket to the wheel in such a manner that the wire rope or cable 48 passes through the center hole 18 and over the outer periphery of the roll bar or rod 48, through or around the pulley 68, and into connection with the lever arm 70.

The spare tire 12 and associated wheel 16 are normally installed in the position beneath the undercarriage of the pickup truck 14 as shown in FIG. 2, and the lever arm 70 is pivoted about the pivot pin 74 in a counter-clockwise direction as viewed in FIG. 2 for placing the outer end thereof in engagement with the latch member 86. It is also preferable to insert the eye member 78 through the slot 88 of the latch 86 whereby a lock, such as the padlock 90, may be utilized for securely retaining the lever arm 70 in this locking position therefor. With the arm 70 in the locking position, the wire rope 48 is pulled taut between the bracket 50 and the connecting point of the rope with the arm 70, thus securely supporting the spare tire 12 and wheel 16 in the elevated storage position thereof against the cross members 20 and 22, as shown in broken lines in FIG. 4.

When it is necessary to retrieve the tire 12 for any reason, such as for replacement for another wheel of the vehicle, or repair or the like, the padlock 90 may be removed and the eye 78 manually removed from the engagement with the slot 88. The arm 70 may then be manually released from engagement with the latch member 86 and pivoted in a clockwise direction (as viewed in FIGS. 2 and 3) about the pivot pin 74. As the lever arm 70 is moved in said clockwise direction, the wire rope passing around the pulley 68 and over the roll bar or rod 44 eases the tire 12 and wheel 16 downwardly to a position on the surface of the ground, as shown in solid lines in FIG. 4. When the arm 70 has been moved to a position adjacent the pulley assembly 62, as shown in broken lines in FIG. 3, the rope 48 will be sufficiently relaxed and of a length whereby the lowered tire 12 may be manually pulled or drawn from beneath the vehicle and the bracket 50 may be removed therefrom whereby the tire may be used as required.

When the tire 12 is to be returned to the storage position, the bracket 50 may be secured to the wheel 16 as hereinbefore set forth, with the tire 12 being placed on the ground in the approximate position shown in elongated dashed lines in FIG. 3. The lever arm 70 may then be rotated in a counterclockwise direction as viewed in FIG. 3, or in a direction away from the rear of the vehicle 14, pulling the rope 48 over the roll bar 44 and around the pulley 68. This pulls or drags the tire 12 to a position beneath the truck and ultimately upwardly to a position against the cross members 20 and 22. A continued pivotal movement of the arm 70 moves the arm beyond the "break" point thereof, and the arm 70 may be returned to the locking position therefor as hereinbefore set forth.

It is to be noted that when the lever arm is in the locking position therefor, the cable or rope 48 extending between the connection point with the arm 70 and the pulley 68 is forward of the lever arm pivot pin 74, thereby applying a counter-clockwise force to the lever arm, as viewed in FIG. 2, to hold the arm in the locked position. Since it requires some manual force to overcome the tension in the rope to dislodge the lever arm 70 from its locked position, it is preferable that the overall length of the lever arm 70 be such that the hand grip member 76 extends approximately two inches outwardly from the bumper 28 so that one may easily grasp the handle member in order to loosen the spare tire in the manner as hereinbefore set forth.

From the foregoing, it will be apparent that the present invention provides a wire rope spare tire carrier having a safety feature of being positively held in a locked position, and also providing a bracket member which may be readily secured to the spare tire wheel in a manner for positively retaining the engagement therebetween.

Whereas the present invention has been described in particular relation to the drawings attached hereto, it should be understood that other and further modifications, apart from those shown or suggested herein may be made within the spirit and scope of this invention.

What is claimed is:

1. A vehicle spare tire carrier comprising a stationary non-rotatable roll bar securable to the vehicle adjacent the storage position of the tire, pulley means secured to the vehicle in spaced relation with respect to the roll bar, an elongated lever arm having one end pivotally secured to the vehicle, the pivot point thereof being in spaced relation with respect to the pulley assembly and having an axis of rotation substantially parallel to the axis of the pulley means, a cable attachment point provided on the the lever arm in spaced relation with respect to the pivot point thereof, a flexible cable extending from the attachment point on the lever arm and around the pulley means and over the roll bar and terminating at a connection with a tire carrier bracket means, the length of the cable being such that when the lever arm is fully pivoted in a first direction the tire may be removed from the vehicle and when the lever arm is pivoted in a second direction the spare tire is pulled into tight engagement with the vehicle and latching means securable to the vehicle for receiving one end of the lever arm thereagainst in one pivotal direction thereof, and means cooperating between the latching means and the lever arm for removably securing the lever arm in said engagement with the latching means, wherein the latching means comprises a latching bracket secured to said rear bumper, said latching bracket being of an arcuate configuration for receiving the lever arm therein, and wherein outwardly extending eye means is provided on the outer periphery of the lever arm and disposed in substantial alignment with the latching bracket member in one position of the lever arm, and said latching bracket is provided with slot means for receiving the eye member therethrough for securely retaining the lever arm means in engagement therewith, and including lock means engagable with the eye member extending through the slot means for further securing the lever arm means against accidental disengagement with the latching bracket member.

2. A vehicle spare tire carrier as set forth in claim 1 wherein the tire carrier bracket means comprises an elongated channel member of a width less than a center opening of the tire for passing therethrough, and bolt means securable between the channel member and the tire for removably securing the bracket means to the tire.

3. A vehetical spare tire carrier as set forth in claim 2 wherein the bolt means extends through an offset aperture provided in the channel member whereby the channel member extends across said center opening of the tire when the bracket means is secured to the tire.

4. A vehicle spare tire carrier as set forth in claim 3 wherein the bolt means is rigidly secured to the channel member.

5. A vehicle spare tire carrier as set forth in claim 1 wherein the pulley assembly comprises holder means securable to the upper surface of said rear bumper, and a pulley journalled in said holder means and having the plane thereof substantially parallel to the plane of the upper surface of said rear bumper.

* * * * *